UNITED STATES PATENT OFFICE.

GEORGE S. RINGLAND, OF FORT DODGE, IOWA, ASSIGNOR TO THE IOWA PLASTER COMPANY, OF SAME PLACE.

PLASTIC COMPOUND FOR BROWN AND ROUGH-COAT PLASTERING.

SPECIFICATION forming part of Letters Patent No. 301,459, dated July 1, 1884.

Application filed June 7, 1884. (No specimens.)

*To all whom it may concern:*

Be it known that I, GEORGE S. RINGLAND, a citizen of the United States, residing at Fort Dodge, Iowa, have invented new and useful Improvements in Plastic Compounds for Brown or Rough-Coat Plastering, of which the following is a specification.

This invention has for its object to provide an efficient, durable, and desirable plastic compound, designed especially for brown or rough-coat plastering, in contradistinction to a compound for finishing or calcining plastered walls; and to such end the invention consists in a compound composed of calcined plaster, or plaster-of-paris, sand, or powdered cinders, and glue or soap, or sour beer and water, the whole being mixed and worked into a plastic form for application as the first coat or brown or rough-coat plastering.

In carrying out my invention, I take of calcined plaster about one hundred and twenty pounds, of sand about two hundred pounds, and of glue about one pound. These I mix or work in a sufficient quantity of water to bring all to a plastic condition. The sand or pulverized cinders imparts body or strength to the compound, the calcined plaster causes the mixture to set or harden, and the glue prevents too rapid setting or hardening, or delays the same sufficiently to enable the compound to be thoroughly worked and applied and troweled down while in a plastic state. The brown or rough-coat plastering compound thus produced will set in about one hour after its application, and will become dry in about one or two days. It may be applied in successive layers or coats, if desired.

I employ pulverized or fine cinders, as less expensive in certain localities than fine river or lake sand, and while the glue will give the required adherence of the compound and delay the setting or drying of the calcine-plaster, I may use sour beer or ordinary washing-soap in lieu of the glue to accomplish the same objects. If I employ sour beer, I use about one quart to the proportions of calcined plaster and sand before mentioned, and if I employ soap I use about one-half pound to the proportions of calcined plaster and sand stated.

From the foregoing it will be seen that in practicing my invention the employment of lime can be dispensed with in producing a mortar suitable for brown or rough-coat plastering, whereby considerable cost is avoided, and a mortar produced equal, if not superior, to mortars in which lime is employed.

Having thus described my invention, what I claim is—

A plastic compound for brown or rough-coat plastering, consisting of calcined plaster, or plaster-of-paris, sand, and glue worked together in water, in the manner and in about the proportions substantially as described.

In testimony whereof I affix my signature in presence of two witnesses.

GEORGE S. RINGLAND.

Witnesses:
JAMES L. NORRIS,
ALBERT H. NORRIS.